United States Patent
Edwards et al.

(10) Patent No.: US 9,034,445 B2
(45) Date of Patent: May 19, 2015

(54) SOLAR REFLECTANCE

(75) Inventors: John L. Edwards, Durham (GB); Karl Lowry, Stockton-on-Tees (GB); Emily Ruth Parnham, Stockton-on-Tees (GB); John Robb, Stockton-on-Tees (GB)

(73) Assignee: TIOXIDE EUROPE LIMITED, Wynyard Park (GB)

( * ) Notice: Subject to any disclaimer, the term of this patent is extended or adjusted under 35 U.S.C. 154(b) by 469 days.

(21) Appl. No.: 13/579,734

(22) PCT Filed: Feb. 11, 2011

(86) PCT No.: PCT/GB2011/050269
§ 371 (c)(1),
(2), (4) Date: Nov. 1, 2012

(87) PCT Pub. No.: WO2011/101659
PCT Pub. Date: Aug. 25, 2011

(65) Prior Publication Data
US 2013/0209717 A1    Aug. 15, 2013

(30) Foreign Application Priority Data
Feb. 17, 2010    (GB) ................... 1002704.3

(51) Int. Cl.
| | |
|---|---|
| A47G 19/22 | (2006.01) |
| C09D 5/33 | (2006.01) |
| B05D 5/06 | (2006.01) |
| B05D 7/00 | (2006.01) |
| C09D 7/12 | (2006.01) |
| C08K 3/22 | (2006.01) |

(52) U.S. Cl.
CPC ........... *C09D 5/004* (2013.01); *Y10T 428/1352* (2015.01); *Y10T 428/1393* (2015.01); *Y10T 428/2927* (2015.01); *Y10T 428/256* (2015.01); *B05D 5/063* (2013.01); *B05D 7/52* (2013.01); *B05D 7/57* (2013.01); *C08K 3/22* (2013.01); *C09D 7/1216* (2013.01); *C09D 7/1275* (2013.01); *C09D 7/1283* (2013.01)

(58) Field of Classification Search
CPC ........... B05D 5/063; B05D 7/52; B05D 7/57; C08K 3/22; C09D 5/004; C09D 7/1216; C09D 7/1275; C09D 7/1283

USPC ........................................................ 428/34.4
See application file for complete search history.

(56) References Cited

U.S. PATENT DOCUMENTS

| | | |
|---|---|---|
| 5,540,998 A | 7/1996 | Yamada et al. |
| 5,962,143 A | 10/1999 | Krauthauser et al. |
| 6,174,360 B1 | 1/2001 | Sliwinski et al. |
| 6,336,397 B1 | 1/2002 | Michel et al. |
| 6,416,868 B1 | 7/2002 | Sullivan et al. |
| 6,521,038 B2 | 2/2003 | Yanagimoto et al. |
| 6,541,112 B1 | 4/2003 | Swiler et al. |
| 6,545,809 B1 | 4/2003 | Phillips |
| 2004/0018360 A1 | 1/2004 | Hugo |
| 2004/0068046 A1 | 4/2004 | Hugo |
| 2004/0191540 A1 | 9/2004 | Jakobi et al. |
| 2005/0129964 A1 | 6/2005 | Hugo |
| 2006/0159926 A1 | 7/2006 | Funaki et al. |
| 2006/0204456 A1 | 9/2006 | Asakura |
| 2009/0268278 A1 | 10/2009 | Suzuki et al. |
| 2009/0272297 A1 | 11/2009 | Stratton et al. |
| 2011/0041726 A1 | 2/2011 | Robb et al. |

FOREIGN PATENT DOCUMENTS

| | | |
|---|---|---|
| DE | 102 04 829 | 7/2003 |
| JP | 2005-97462 A | 4/2005 |
| WO | WO 01/29137 A | 4/2001 |
| WO | WO 02/12405 A | 2/2002 |
| WO | WO 02/057374 A | 7/2002 |
| WO | WO 2004/094539 A | 4/2004 |
| WO | WO 2006/058782 A | 6/2006 |
| WO | WO 2009/134461 A | 11/2009 |
| WO | WO 2009/136141 A | 11/2009 |

*Primary Examiner* — James Yager
(74) *Attorney, Agent, or Firm* — Monique M. Raub

(57) ABSTRACT

The invention provides a layered colored solar reflective system comprising (i) a first layer comprising a first particulate material having a substantially rutile crystal habit and an average particle size within a range of about 0.55 μm and about 0.95 μm, dispersed in a vehicle and (ii) a second layer positioned on at least a portion of the first layer, the second layer comprising a second particulate material having a substantially rutile crystal habit and an average particle size within a range of about 1.0 μm and 1.6 μm, and a colorant dispersed in a vehicle. The layered color solar reflective system may be applied onto a structure to provide a dark, intense color as well as enhanced total solar reflectance.

22 Claims, No Drawings

SOLAR REFLECTANCE

CROSS-REFERENCE TO RELATED APPLICATIONS

This application is the National Phase of International Application PCT/GB2011/050269 filed Feb. 11, 2011 which designated the U.S. and which claims priority to Great Britain App. Serial No. 1002704.3 filed Feb. 17, 2010. The noted applications are incorporated herein by reference.

FIELD OF THE INVENTION

This disclosure, in general, relates to colored solar reflective systems which provide high solar reflectance and to various uses of such colored systems.

BACKGROUND

New technologies are continuously being developed to improve energy efficiency. One such technology is the use of infrared reflective pigments in coatings positioned on a building's (or other object's) exterior. As one is aware, the sun emits about 50% of its energy as near-infrared radiation. When this near-infrared radiation is absorbed, it is physically converted into heat. Coatings containing infrared reflective pigments work by reflecting away sunlight and by blocking the transfer of heat thereby reducing the heat load to the building. For example, white pigments, such as titanium oxide, have been used in coatings to reflect a majority of the sun's energy. Oftentimes, it's desirable to provide a colored coating in place of white for aesthetic reasons. However, the selection of pigments that are available for use is limited since they tend to absorb more of the sun's energy than is desired leading to a marked reduction in the above-described effect. Thus, various systems have been and continue to be tried to provide colored coatings having improved solar reflectance.

For example, U.S. Pat. No. 5,540,998 describes a system in which two or more non-white pigments having particle diameters of 50 µm or less are combined to yield a color of low lightness, and in particular, achromatic black. U.S. Pat. No. 5,962,143 further describes a dark colored coating that contains one or more black pigments, one or more non-white pigments and silicic acid.

In U.S. Pat. No. 6,174,360, the use of complex inorganic colored pigments (CICP's) in coatings are taught to exhibit dark drab colors in the visible portion along with reflectivity in the near-infrared portion of the electromagnetic spectrum.

U.S. Pat. No. 6,336,397 describes an infrared reflective system containing two or more layers with one layer containing a resin and pigment which provides the desired color and another layer containing a pigment which provides infrared reflectance. U.S. Pat. Publ. No. 2009/0268278 also discloses a two layer sheet-like infrared reflective system having a top layer consisting of a synthetic resin and an organic pigment laminated onto a bottom layer consisting of a synthetic resin and a titanium oxide-based white pigment. WO 04/094539 further discloses a layered system having a primer layer which is lighter in color and more reflective than a basecoat layer.

In addition, U.S. Pat. No. 6,521,038 teaches a near-infrared reflecting composite pigment containing a near-infrared non-absorbing colorant and a white pigment that is coated with such a colorant. The composite pigment may then be used as a coloring agent in coatings.

Finally, WO 2009/136141 describes the use of near-infrared-scattering particulate material which provides high reflection of near-infrared radiation and diminished reflectance of visible light in combination with various colorants.

Although each provide solar reflectance, some of the disadvantages in using these currently available systems include: they provide relatively pale coloring since a high level of conventional titanium dioxide is needed to give the desired level of solar reflection; impurities contained within the systems can lead to absorptions in the near-infrared part of the spectrum resulting in a reduction of solar reflectance; and primer layers are not engineered to give maximum solar reflectance. As such, alternative systems which exhibit enhanced solar reflectivity in a wide range of dark or more intense uniform colors than is otherwise achievable is still highly desirable.

SUMMARY

The present invention provides a layered colored solar reflective system including a first layer comprising a first particulate material having a substantially rutile crystal habit and an average particle size between about 0.55 µm and 0.95 µm dispersed in a vehicle and a second layer comprising a second particulate material having a substantially rutile crystal habit and an average particle size between about 1.0 µm and 1.6 µm and a colorant dispersed in a vehicle. The layered color solar reflective system may be applied onto a structure to provide a dark, intense color as well as enhanced total solar reflectance.

In one aspect, the present disclosure provides a layered colored solar reflective system containing (i) a first layer which includes a first particulate material having a substantially rutile crystal habit and an average particle size within a range of about 0.55 µm and about 0.95 µm dispersed in a vehicle and (ii) a second layer positioned on at least a portion of the first layer, the second layer which includes a second particulate material having a substantially rutile crystal habit and an average particle size within a range of about 1.0 µm and 1.6 µm and a colorant dispersed in a vehicle.

In another aspect, the layered colored solar reflective system may be used to coat a structure, for example, an automobile, a building, an aircraft or vessel, to allow the structure to exhibit deep, bright, vibrant color as well as high total solar reflectance.

DESCRIPTION OF THE PREFERRED EMBODIMENT(S)

In this specification and in the claims which follow, reference will be made to a number of terms which shall be understood to have the following meanings.

The term "visible light" refers to electromagnetic radiation having a wavelength in the range of 400 nm to 760 nm of the electromagnetic spectrum.

The term "near-infrared light" refers to electromagnetic radiation having a wavelength within the range of 760 nm to about 2500 nm of the electromagnetic spectrum.

The term "total solar reflectance" or "TSR" refers to the fraction of the incident solar energy (~360 nm-2500 nm) that is reflected by a surface in question. It is a ratio of energies of the reflected wave to that of the incident wave. For example, a reflectance of 0.8 equals a reflectance of 80% of the incident wave. The total solar reflectance may be determined as specified in standard test method ASTM E903, the entire contents of which are incorporated herein by reference.

The term "energy consumption" refers to the usage or consumption of conventional forms of energy, for example, electricity, gas, etc. Thus, the reduction of energy consumption in a structure pertains to lower usage of for example, electricity in the structure.

The term "structure" or "substrate" refers to any object which may be exposed to the sun, for example, a building, an automobile, a train, a container, a vessel, piping, flooring, a deck, a textile, an airplane, a ship, a submarine, a window profile, siding, roofing granules, roofing shingles, an agricultural film, a food packaging film, a glass product including architectural glass, and industrial glass. The material of the structure or substrate is not limited; therefore, it and its surface may comprise metal, glass, ceramic, plastic, concrete, wood, tile, natural or artificial fibers, rubber, etc.

The term "transparent" refers to having the capability of transmitting energy, for example, light, without appreciable scattering.

The present disclosure in general relates to layered colored solar reflective systems. The layered colored solar reflective systems provide improved infrared reflectivity in structures made with or covered by these systems while further providing previously inaccessible colors and tones. For example, application of the present layered colored solar reflective system to an exterior surface of a structure, such as a wall or roof, allows the structure to exhibit increased total solar reflectance. This, in turn, results in a lower surface temperature and heat transfer through the coated structure. Therefore, the interior temperature of the structure is cooler and accordingly, less energy is needed to cool the interior of the structure. In addition, the potential loss by evaporation of any volatile components contained within the structure is reduced. Furthermore, structural integrity is improved since damage caused by heat, such as cracks, thermal warping and color fading, is significantly diminished.

According to one embodiment, the layered colored solar reflective system includes (i) a first layer comprising a first particulate material having a substantially rutile crystal habit and an average particle size within a range of about 0.55 µm and about 0.95 µm, preferably within a range of about 0.6 µm and about 0.9 µm, and even more preferably within a range of about 0.7 µm and about 0.8 dispersed in a vehicle and (ii) a second layer positioned on at least a portion of the first layer, the second layer comprising a second particulate material having a substantially rutile crystal habit and an average particle size within a range of about 1.0 µm and 1.6 µm, preferably within a range of about 1.2 µm and about 1.4 µm, and a colorant dispersed in a vehicle.

In one embodiment, the first particulate material is selected from titanium dioxide, doped titanium dioxide, and a mixture thereof.

The titanium dioxide useful in the first layer of the present invention is one capable of scattering the maximum near-infrared light. Such properties may be obtained when the titanium dioxide has an average particle size within a range of about 0.55 µm and about 0.95 µm. In still another embodiment, the titanium dioxide in the first layer has an average particle size within a range of about 0.6 µm and about 0.9 and more preferably within a range of about 0.7 µm and about 0.8 µm. It has been surprisingly found that such titanium dioxide reflects near-infrared light at an unusually high level.

Because of its high refractive index, the titanium dioxide useful in the first layer of the present invention is substantially in a rutile crystal habit. Thus, according to another embodiment, greater than 90% by weight of the titanium dioxide in the first layer, preferably greater than 95% by weight of the titanium dioxide in the first layer, and even more preferably greater than 99% by weight of the titanium dioxide in the first layer, based on the total weight of the first particulate material, is in the rutile crystal habit.

As one skilled in the art is aware, crystal size is distinct from particle size. Crystal size relates to the size of the fundamental crystals which make up the particulate material. These crystals may then aggregate to some degree to form larger particles. For example, conventional titanium dioxide in a rutile crystal form has a crystal size of about 0.17 µm-0.29 µm and a particle size of about 0.25 µm-0.40 µm while conventional titanium dioxide in an anatase crystal form has a crystal size of about 0.10 µm-0.25 µm and a particle size of about 0.20 µm-0.40 µm. The particle size is thus affected by factors such as the crystal size as well as milling techniques used during production, such as dry, wet or incorporative milling. Accordingly, preferably the particle size of the titanium dioxide in the first layer is about equal to the crystal size.

The crystal size and particle size of the titanium dioxide in the first layer may be determined by methods well known to those skilled in the art. For example, the crystal size may be determined by transmission electron microscopy on a rubbed out sample with image analysis of the resulting photograph. The results of the crystal size may further be validated by reference using latex NANOSHPHERE™ Size Standards (available from Thermo Scientific). A method which may be used for determining the particle size of the titanium dioxide includes X-ray sedimentation.

Known processes which may be used to prepare the titanium dioxide in the first layer include, but are not limited to, the sulfate process, chloride process, fluoride process, hydrothermal process, aerosol process and leaching process; however, each such known process is modified by one or more of the following conditions necessary to achieve the desired average particle size:
(a) treating at a higher temperature, for example, 900° C. or higher;
(b) treating for a longer period of time, for example, 5 hours or more;
(c) increasing or reducing typical levels of growth moderators present during the process; and
(d) reducing the typical level of rutile seeds.

Thus, for example, the titanium dioxide in the first layer may be prepared by the sulfate process which generally includes:
(i) reacting a titaniferous feedstock with sulfuric acid to form a solid, water soluble reaction cake;
(ii) dissolving the reaction cake in water and/or weak acid to produce a titanium sulfate solution;
(iii) hydrolyzing the titanium sulfate solution to convert titanium sulfate to titanium dioxide hydrate; and
(iv) separating the precipitated titanium dioxide hydrate from the solution and calcining to obtain titanium dioxide wherein the process is modified by one or more of the conditions (a)-(d) described above to achieve the desired average particle size. In one embodiment the process is modified by condition (a); in another the process is modified by condition (b); in another the process is modified by condition (c); and in another the process is modified by condition (d).

The titanium dioxide in the first layer may be white or translucent or it may be colored. Preferably, the titanium dioxide in the first layer is white. Thus, in one embodiment, the titanium dioxide in the first layer has a lightness value L* (CIE L*a*b* color space) greater than 95, an a* value less than 5 and a b* value less than 5.

In another embodiment, the first particulate material is a doped titanium dioxide. As used herein, "doped titanium dioxide in the first layer" refers to the titanium dioxide in the first layer of the present disclosure but further including one or more dopants which have been incorporated during its preparation. The dopants, which may be incorporated by known processes, may include, but are not limited to, calcium, magnesium, sodium, nickel, aluminum, antimony, phosphorus, or cesium. The dopant may be incorporated in an amount of no more than 30% by weight, preferably no more than 15% by weight, and more preferably no more than 5% by weight, based on the total weight of the titanium dioxide in the first layer. For example the dopant may be incorporated in an amount of from 0.1 to 30% by weight, or 0.5 to 15% by weight, or 1 to 5% by weight, relative to the total weight of the titanium dioxide. Such doped titanium dioxide may be recognized by being substantially in a rutile crystal habit. Thus, according to another embodiment, greater than 90% by weight of the doped titanium dioxide in the first layer, preferably greater than 95% by weight of the doped titanium dioxide in the first layer, and even more preferably greater than 99% by weight of the doped titanium dioxide in the first layer, based on the total weight of the first particulate material, is in the rutile habit.

In still another embodiment, the first particulate material may further be treated as known in the art with a coating agent to form coated titanium dioxide or coated doped titanium dioxide. For example, the first particulate material may be dispersed in water along with the coating agent. The pH of the solution may then be adjusted to precipitate the desired hydrated oxide to form a coating on the surface of the first particulate material. After coating, the first particulate material may be washed and dried before being ground, for example, in a fluid energy mill or micronizer, to separate particles stuck together by the coating. At this milling stage, an organic surface treatment may also be applied if desired.

Coating agents suitable for use include those commonly used to coat an inorganic oxide or hydrous oxide onto the surface of particles. Typical inorganic oxides and hydrous oxides include one or more oxides and/or hydrous oxides of silicon, aluminum, titanium, zirconium, magnesium, zinc, cerium, phosphorus, or tin, for example, $Al_2O_3$, $SiO_2$, $ZrO_2$, $CeO_2$, $P_2O_5$, sodium silicate, potassium silicate, sodium aluminate, aluminum chloride, aluminum sulphate or a mixture thereof. The amount of coating that is coated onto the surface of the titanium dioxide or doped titanium dioxide in the first layer may range from about 0.1% by weight to about 20% by weight of the inorganic oxide and/or hydrous oxide relative to the total weight of the titanium dioxide or doped titanium dioxide in the first layer.

Organic surface treatments suitable for application at the milling stage include polyols, amines, alkyl phosphonic acids and silicone derivatives. For example, the organic surface treatment may be trimethylolpropane, pentaerythritol, triethanolamine, n-octyl phosphonic acid or trimethylolethane.

The first particulate material is then dispersed within a vehicle. The vehicle may be any component or combination of components within which the first particulate material can be dispersed.

In one embodiment, the vehicle is a synthetic or natural resin. The resin may be, but is not limited to, a polyolefin resin, polyvinyl chloride resin, ABS resin, polystyrene resin, methacrylic resin, polycarbonate resin, polyethylene terephthalate resin, polyamide resin, alkyd resin, acrylic resin, polyurethane resin, polyester resin, melamine resin, fluoropolymer or epoxy resin.

In another embodiment, the vehicle is a carrier. The carrier may be, but is not limited to, an aqueous solvent, for example, water. The carrier may also be a nonaqueous solvent, for example, an organic solvent such as a petroleum distillate, alcohol, ketone, ester, glycol ether and the like.

In yet another embodiment, the vehicle is a binder. The binder may be a metal silicate binder, for example an aluminosilicate binder. The binder may also be a polymeric binder, for example, an acrylic polymer or copolymer binder.

The amount of first particulate material dispersed within the vehicle is not limited; however, an amount within a range of about 5% by volume to about 40% by volume, based on the total volume of components in the first layer, is preferable.

It is contemplated that the first layer is applied directly to a surface of a structure or substrate. However, in some embodiments, the structure or substrate may also include additional treatment layers. The first layer however is still considered to be applied onto the surface of the structure in the embodiments when such additional layers are applied onto the structure. For example, when the structure is a panel of a vehicle, such as an automobile or aircraft, the panel may also include an electrocoat treatment layer or a phosphate treatment layer thereon. Although in this example, the first layer is actually applied to the electrocoat or phosphate layer, the first layer is still considered to be applied onto the surface of the structure.

The second layer is then positioned onto at least a portion of the first layer. According to some embodiments, "at least a portion" means that the second layer covers greater than 50%, preferably greater than 90%, and more preferably greater than 99.99% of the first layer. In addition, in preferred embodiments the second layer is positioned on top of the first layer and opposite the surface of the structure. The second layer includes a second particulate material having a substantially rutile crystal habit and an average particle size within a range of about 1.0 μm and 1.6 μm, preferably within a range of about 1.2 μm and about 1.4 μm, and a colorant dispersed in a vehicle.

According to one embodiment, the second particulate material is selected from titanium dioxide, doped titanium dioxide, and a mixture thereof.

The titanium dioxide useful in the second layer of the present invention is one capable of scattering near-infrared light while also exhibiting noticeably diminished reflectance of visible light when compared to conventional titanium dioxide pigment. In contrast to conventional titanium dioxide, which is very reflective of visible light making the color of conventional colored systems in which it is used pale, the titanium dioxide of the second layer blends with the colorant without unduly affecting the color of the layer to provide a more widely available pallet of dark or more intensely colored layers. Such properties may be obtained when the titanium dioxide in the second layer has an average particle size within a range of about 1.0 μm and about 1.6 μm. In still another embodiment, the titanium dioxide in the second layer has an average particle size within a range of about 1.1 μm and about 1.5 μm, and more preferably within a range of about 1.2 μm and about 1.4 μm. It has been surprisingly found that such titanium dioxide scatters near-infrared light at an unusually high level without impact on tint reduction.

The titanium dioxide useful in the second layer of the present invention is substantially in a rutile crystal habit. Thus, according to another embodiment, greater than 90% by weight of the titanium dioxide in the second layer, preferably greater than 95% by weight of the titanium dioxide in the second layer, and even more preferably greater than 99% by weight of the titanium dioxide in the second layer, based on the total weight of the second particulate material, is in the rutile crystal habit.

As mentioned above, one skilled in the art is aware that crystal size is distinct from particle size. Accordingly, preferably the particle size of the titanium dioxide in the second layer is about equal to the crystal size.

The crystal size and particle size of the titanium dioxide in the second layer may be determined by methods well known to those skilled in the art such as those described above. For example, the crystal size may be determined by transmission electron microscopy and the particle size may be determined by X-ray sedimentation.

Known processes, such as those described above, may be used to prepare the titanium dioxide in the second layer including, but not limited to, the sulfate process, chloride process, fluoride process, hydrothermal process, aerosol process and leaching process. However, each such known process is modified by one or more of the conditions (a)-(d) described above to obtain the desired average particle size for the titanium dioxide in the second layer. In one embodiment the process is modified by condition (a); in another the process is modified by condition (b); in another the process is modified by condition (c); and in another the process is modified by condition (d).

In some embodiments, the titanium dioxide in the second layer may be white or translucent or it may be colored. Preferably, the titanium dioxide in the second layer is white. Thus, in one embodiment, the titanium dioxide in the second layer has a lightness value $L^*$ (CIE $L^*a^*b^*$ color space) greater than 95, an $a^*$ value less than 5 and a $b^*$ value less than 5.

In another embodiment, the second particulate material is a doped titanium dioxide. As used herein, "doped titanium dioxide in the second layer" refers to the titanium dioxide in the second layer of the present disclosure but further including one or more dopants which have been incorporated during its preparation. The dopants, which may be incorporated by known processes, may include, but are not limited to, calcium, magnesium, sodium, vanadium, chromium, nickel, aluminum, antimony, niobium, phosphorus, or cesium. The dopant may be incorporated in an amount of no more than 30% by weight, preferably no more than 15% by weight, and more preferably no more than 5% by weight, based on the total weight of the titanium dioxide in the second layer. For example the dopant may be incorporated in an amount of from 0.1 to 30% by weight, or 0.5 to 15% by weight, or 1 to 5% by weight, relative to the total weight of the titanium dioxide.

In still another embodiment, the second particulate material may further be treated as known in the art with a coating agent to form coated titanium dioxide or coated doped titanium dioxide as described above.

Coating agents suitable for use include those commonly used to coat an inorganic oxide or hydrous oxide onto the surface of particles. Typical inorganic oxides and hydrous oxides include one or more oxides and/or hydrous oxides of silicon, aluminum, titanium, zirconium, magnesium, zinc, cerium, phosphorus, or tin, for example, $Al_2O_3$, $SiO_2$, $ZrO_2$, $CeO_2$, $P_2O_5$, sodium silicate, potassium silicate, sodium aluminate, aluminum chloride, aluminum sulphate or a mixture thereof. The amount of coating coated onto the surface of the titanium dioxide or doped titanium dioxide may range from about 0.1% by weight to about 20% by weight of the inorganic oxide and/or hydrous oxide relative to the total weight of the titanium dioxide or doped titanium dioxide in the second layer.

Organic surface treatments suitable for application at the milling stage include polyols, amines, alkyl phosphonic acids and silicone derivatives. For example, the organic surface treatment may be trimethylolpropane, pentaerythritol, triethanolamine, n-octyl phosphonic acid or trimethylolethane.

The second layer also comprises a colorant. According to various embodiments, the second layer may include a single colorant or two or more different colorants. The colorant may be selected from a black, brown, blue, cyan, green, violet, magenta, red, orange, yellow pigment and a mixture thereof. The selection will depend on the necessary colorants needed to achieve the desired color.

In one embodiment, the colorant is selected from one or more inorganic colorants, one or more organic colorants, and a mixture thereof. Examples of inorganic colorants include, but are not limited to, coated or uncoated metal oxide pigments such as, boron, chrome, cobalt, gallium, indium, iron, lanthanum, manganese, molybdenum, neodymium, nickel, niobium, vanadium and composite metal oxide system pigments, and complex inorganic color pigments, such as those described in U.S. Pat. Nos. 6,174,360, 6,416,868 and 6,541,112, the entire contents of which are hereby incorporated by reference.

Examples of organic pigments include, but are not limited to, copper phthalocyanine, dissimilar metal (e.g. nickel, cobalt, iron, etc.) phthalocyanine, non-metallic phthalocyanine, chlorinated phthalocyanine, chlorinated-brominated phthalocyanine, brominated phthalocyanine, anthraquinone, quinacridone system pigment, diketopyrrolopyrrole system pigment, perylene system pigment, monazo system pigment, diazo system pigment, condensed azo system pigment, metal complex system pigment, quinophthalone system pigment, indanthrene blue pigment, dioxadene violet pigment, benzimidazolone system pigment, perinone system pigment, indigo/thioindigo system pigment, dioxazine system pigment, isoindolinone system pigment, isoindoline system pigment, azomethine or azomethine-azo system pigment.

The second particulate material and the one or more colorants are then dispersed in a vehicle. The vehicle may be the same as or different than the vehicle in the first layer and may include any component or combination of components within which the second particulate material and colorant(s) can be dispersed. The vehicle may include a synthetic or natural resin, a carrier and/or a binder. Examples of such resins, carriers and binders are described above.

The amount of second particulate material and colorant dispersed within the vehicle is not limited; however, an amount of colorant within a range of about 0.1% by volume to about 20% by volume and an amount of second particulate material within a range of about 5% by volume to about 40% by volume, based on the total volume of components in the second layer, is preferable.

Preferably, the first layer and second layers are formed from a first coating composition and second coating composition, respectively. The coating compositions may be liquid, for example, a paint or ink, or may be powder, or may be a foil. Therefore, in one embodiment, a method for providing or preparing a layered colored solar reflective system includes applying the first coating composition onto the structure to form the first layer on the surface of the structure and then applying the second coating composition on at least a portion of the first layer to form the second layer. In other embodiments, one or both of the first or second layers may be a thermoset or thermoplastic mat that is extruded from solid components and which adheres to either the structure and/or the first layer.

The layered system may optionally include one or more additional layers applied onto the second layer. If present, these one or more additional layers are transparent in the near-infrared light region so that near-infrared light external to the structure transmits through these one or more additional layers. For example, in one embodiment the layered system may contain a third layer formed from a coating composition, such as a clearcoat coating composition. The clearcoat coating composition is applied onto at least a portion of the second layer to form a clearcoat layer. The clearcoat coating composition may be solventborne-based, waterborne-based or powder-based and can include acrylic, melamine, polyester, carbonates, silanes, carbamates, isocyanates, and/or polyurethanes and mixtures thereof.

The first, second and any optional coating compositions, and therefore the respective layers, may further include one or more customary additives. Additives suitable for use include, but are not limited to, thickeners, stabilizers, emulsifiers, texturizers, adhesion promoters, UV stabilizers, de-glossing agents, dispersants, antifoaming agents, wetting agents, coalescing agents, and biocides/fungicides.

The first, second and any optional coating compositions, and therefore the respective layers, may also include one or more spacer particles useful in spacing out or supporting material contained within the composition. The spacer particles may be silica, silicates, aluminates, sulphates, carbonates, clays, or polymeric particles in the form of hollow beads or in the form of microspheres.

The first, second and any optional coating compositions may be applied by any known means, for example, by spraying (e.g. air or rotary-atomized), dipping, rolling, brushing etc. In one embodiment, the first coating composition is spayed onto the structure to form the first layer, the second coating composition is sprayed onto at least a portion of the first layer to form the second layer, and optionally, the third coating composition is sprayed onto at least a portion of the second layer to form the third layer. These coatings may be applied "wet-on-wet" or "wet-on-wet-on-wet" with or without flash times between each layer. In addition, the step of curing one layer before subsequent application of the next layer may also be preferred. Thus, in one embodiment, the first layer is cured prior to the step of applying the second coating composition.

Although varying depending on the application thereof, in one embodiment the thickness of the layered colored solar reflective system is no greater than about 55 µm, preferably no greater than about 50 µm, more preferably no greater than about 45 µm, and even more preferably no greater than about 40 µm. In other embodiments, the thickness of the first layer is within a range of about 1 µm and about 20 µm and the thickness of the second layer is within a range of about 5 µm and about 35 µm.

In still another embodiment, the first, second and optional third layer may be extruded to form first, second and when present, third laminate layers on the structure.

In still another embodiment, the present disclosure provides a coated structure comprising the layered colored solar reflective system positioned on one or more surfaces of the structure.

In another embodiment, the present disclosure provides a layered colored solar reflective system exhibiting a lightness value L* (CIE L*a*b* color space) of 75 or less, preferably 65 or less, more preferably 55 or less, even more preferably 45 or less.

As mentioned above, the layered colored solar reflective system also provides enhanced near-infrared reflectivity. Thus, in another embodiment, the layered colored solar reflective system exhibits a total solar reflectance of greater than 30%. In still another embodiment, the layered colored solar reflective system exhibits a total solar reflectance of greater than 35%, preferably greater than 40%, and even more preferably greater than 45%.

In a further embodiment, the present disclosure provides a structure comprising the layered colored solar reflective system wherein the structure exhibits a total solar reflectance of greater than 30%, preferably greater than 35%, more preferably greater than 40%, and even more preferably greater than 45%.

In yet still another embodiment, the present disclosure provides a method for reducing the energy consumption of a structure by applying the layered colored solar reflective system to one or more surfaces of the structure. Because of its enhanced near-infrared reflectivity, the layered system causes the surface temperature of the resultant coated surface to be lowered relative to the surface temperature of a surface coated with a non-reflective coating of the same color. Thus, less energy is needed to cool the interior of the structure.

In another embodiment, the layered colored solar reflective system may be used to control the temperature increase of a structure exposed to infrared radiation. This embodiment includes applying a first coating composition onto the structure to form a first layer and (ii) applying a second coating composition onto at least a portion of the first layer to form a second layer wherein the first coating composition comprises a first particulate material having a substantially rutile crystal habit and an average particle size within a range of about 0.55 µm and about 0.95 µm, preferably within a range of about 0.6 µm and about 0.9 µm, and even more preferably within a range of about 0.7 µm and about 0.8 µm, dispersed in a vehicle and wherein the second coating composition comprises a second particulate material having a substantially rutile crystal habit and an average particle size within a range of about 1.0 µm and 1.6 µm, preferably within a range of about 1.2 µm and about 1.4 µm, and one or more colorants dispersed in a vehicle.

As discussed throughout, it has been surprisingly found that the layered colored solar reflective system of the present disclosure is particularly suited for producing cool deep, bright, vibrant or dark colors which can be applied to a variety of structures or substrates. The second layer absorbs a broad spectrum of visible light to achieve the desired color while providing reasonable reflectance to near-infrared light. The first layer provides optimal solar reflectance substantially without impacting tint reduction. The combination of the two layers leads to a surprisingly high total solar reflectance in a colored layered system which may be applied over an absorbing structure or substrate. In this manner the structure or substrate coated therewith experiences reduced temperature increase as compared to conventional layered systems by expelling near-infrared light. The layered colored solar reflective system is particularly useful in automotive coatings, architectural coatings, industrial coatings, aerospace coatings and flexible coatings (such as on textiles).

The present invention will be further illustrated by a consideration of the following examples, which are intended to be exemplary of the invention.

EXAMPLES

Example 1A

Production of a white 30% titanium dioxide volume concentration primer paint and application to a substrate.

A clear resin solution was prepared using an acrylic resin, a crosslinker and a solvent. The quantities of each component are specified below in Table 1.

TABLE 1

| Clear resin solution make-up. | |
|---|---|
| Clear Resin Solution | % by weight |
| 60% Acrylic Resin (40% solvent) | 68 |
| Solvent | 9 |
| Crosslinker | 23 |

19.57 g of 0.7 micron particle size titanium dioxide was added to 7.5 g of the clear resin solution to create a millbase which was then vigorously mixed for 30 seconds. This tinted millbase was then let down with a further 15 g of clear resin. This millbase was then milled for a further 2 minutes to give the white primer paint. This was drawn down over a Hot Dipped Galvanised (HDG) steel panel using a number 3 wire wound applicator giving a primer dry film thickness of about 9.8 microns. The solvents were allowed to evaporate and the panel was then stoved at 105° C. for 30 minutes.

Example 1B

Production of colored paint and its application to the HDG steel panel and primer layer.

A tint concentrate was prepared for each of the specified pigments (PY180 Clariant Fast Yellow HG, PR122HPC PR1220, PV23 Ciba Cromophtal Violet Gt, PBlack 32 BASF Paliogen Black L0086, PO71 Ciba Irgazin DPP Cosmoray, PY128 Ciba 8GNP) using an acrylic resin, a wetting and dispersing additive, a solvent and the specified tint. The quantities of each component are specified in Table 2. The tint concentrate was then milled with steel ballotini.

TABLE 2

| Tinter concentrate make-up. | | | |
|---|---|---|---|
| Tinter Concentrate Component | PV23 % by weight | PR122, PY180, PO 71, PY128 % by weight | PB32 % by weight |
| 60% Acrylic Resin (40% solvent) | 78 | 71 | 69 |
| Solvent | 4 | 4 | 4 |
| Wetting & Dispersing Additive | 9 | 8 | 8 |
| Tint | 9 | 16 | 20 |

One will appreciate that rals are standard colors and that the ral system is a system of standard colors. A colored solution was made up for ral 3003 and ral 8004 by taking the quantities as specified in Table 3 of each of the required tinter concentrates and vigorously mixing for 2 minutes with the specified amount of additional acrylic resin.

TABLE 3

| Colored resin solution make up. | | |
|---|---|---|
| | ral 3003 | ral 8004 |
| Tint conc PR122 (g) | 5.33 | 6.9 |
| Tint conc PY128 (g) | 18.88 | — |
| Tint conc PB32 (g) | 0.125 | — |
| Tint conc PV23 (g) | — | 4.1 |
| Tint conc PY180 (g) | — | 32.9 |
| Tint conc PO71 (g) | — | 50.4 |
| 60% Acrylic Resin (40% solvent) (g) | 0.725 | 5.6 |

1.4 micron particle size titanium dioxide (quantity specified in Table 4) was then added to 7.5 g of the colored resin solution to create a millbase which was then vigorously mixed for 30 seconds. This tinted millbase was then let down with a further 13 g of colored resin. This millbase was then milled for an additional 2 minutes. The paint was drawn down over the HDG steel panel and primer layer (as prepared in example 1A) using a number 4 wire wound applicator giving a topcoat dry thickness of 22 microns. The solvents were allowed to evaporate and the panel was then stoved at 105° C. for 30 minutes. Total film thickness was equal to 32 microns.

TABLE 4

| Quantity of titanium dioxide added to colored resin solution. | | |
|---|---|---|
| | ral 3003 | ral 8004 |
| $TiO_2$ (g) | 3.6 | 13.2 |
| $TiO_2$ volume conc. % | 8 | 24 |

Reflectance spectra were measured using a UV/vis/NIR spectrophotometer with an integrating sphere and a wavelength range of 300 nm-2500 nm. Total Solar Reflectance was calculated from this data, according to the method described in ASTM E903. L*, a* & b* under a D65 illuminant, are also calculated from this data. The total solar reflectance for ral 3003 was determined to be 47% while the total solar reflectance for ral 8004 was determined to be 50%.

Example 1C

The results in example 1B were compared to data collected from publicly available TSR values for standard pigmentation 2 layered systems and are shown below in Table 5.

TABLE 5

| TSR values for a conventional 2 layered system compared to the inventive system. | | | |
|---|---|---|---|
| ral Number | TSR % Conventional System | TSR % Inventive System | TSR % uplift |
| 3003 | 27 | 47 | 20 |
| 8004 | 33 | 50 | 17 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A layered colored solar reflective system comprising (i) a first layer comprising a first particulate material having a substantially rutile crystal habit and an average particle size within a range of about 0.55 µm and about 0.95 µm dispersed in a vehicle and (ii) a second layer positioned on at least a portion of the first layer, the second layer comprising a second particulate material having a substantially rutile crystal habit and an average particle size within a range of about 1.0 µm and 1.6 µm and a colorant dispersed in a vehicle.

2. The layered colored solar reflective system of claim 1, wherein the first particulate material and second particulate material are independently selected from the group consisting of titanium dioxide, doped titanium dioxide and a mixture thereof.

3. The layered colored solar reflective system of claim 2, wherein the first particulate material and second particulate material are titanium dioxide.

4. The layered colored solar reflective system of claim 1, wherein the colorant is selected from one or more inorganic pigments, one or more organic pigments and a mixture thereof.

5. The layered colored solar reflective system of claim 4, wherein the colorant is one or more inorganic colorants selected from the group of: a coated or uncoated metal oxide pigment, a composite metal oxide system pigment, and a complex inorganic color pigment.

6. The layered colored solar reflective system of claim 4, wherein the colorant is one or more organic pigments selected from the group of: a copper phthalocyanine pigment, a dissimilar metal phthalocyanine pigment, a non-metallic phthalocyanine pigment, a chlorinated phthalocyanine pigment, a chlorinated-brominated phthalocyanine pigment, a brominated phthalocyanine pigment, an anthraquinone pigment, a quinacridone system pigment, a diketopyrrolopyrrole system pigment, a perylene system pigment, a monazo system pigment, a diazo system pigment, a condensed azo system pigment, a metal complex system pigment, a quinophthalone system pigment, an indanthrene blue pigment, a dioxadene violet pigment, a benzimidazolone system pigment, a perinone system pigment, an indigo/thioindigo system pigment, a dioxazine system pigment, an isoindolinone system pigment, an isoindoline system pigment, an azomethine and an azomethine-azo system pigment.

7. The layered colored solar reflective system of claim 1, wherein the vehicle in the first layer and the vehicle in the second layer are independently selected from a synthetic resin, a natural resin, a carrier, a binder, and a mixture thereof.

8. The layered colored solar reflective system of claim 1, wherein the thickness of the layered colored solar reflective system is no greater than about 55 μm.

9. A coated structure comprising the layered colored solar reflective system of claim 1 positioned on a surface of the structure.

10. The coated structure of claim 9, wherein the surface comprises metal, glass, ceramic, plastic, concrete, asphalt, wood, tile, natural fiber, artificial fiber, or rubber.

11. The coated structure of claim 9, wherein the structure is a building, an automobile, a train, a container, a vessel, piping, flooring, a deck, a textile, an airplane, a ship, a submarine, a window profile, siding, roofing granules, roofing shingles, an agricultural film, a food packaging film or a glass product.

12. A method for producing a layered color solar reflective system comprising: (i) applying a first coating composition onto a structure to form a first layer and (ii) applying a second coating composition onto at least a portion of the first layer to form a second layer, wherein the first coating composition comprises a first particulate material having a substantially rutile crystal habit and an average particle size within a range of about 0.55 μm and about 0.95 μm dispersed in a vehicle and wherein the second coating composition comprises a second particulate material having a substantially rutile crystal habit and an average particle size within a range of about 1.0 μm and 1.6 μm and a colorant dispersed in a vehicle.

13. The method of claim 12, wherein the first and second coating compositions are each a composition selected from: a paint, an ink, a powder and a foil.

14. The method of claim 12 further comprising applying a third coating composition onto at least a portion of the second layer to form a third layer.

15. The method of claim 14, wherein the first coating composition is a primer surface coating composition, the second coating composition is a basecoat coating composition and the third layer is a clearcoat coating composition.

16. The method of claim 12, wherein the first and second coating compositions are applied by spraying, dipping, rolling, brushing, or extruding.

17. The method of claim 12, wherein the thickness of the first layer is within a range of about 1 μm and about 20 μm and the thickness of the second layer is within a range of about 5 μm and about 35 μm.

18. A structure comprising the layered colored solar reflective system according to claim 1 wherein the structure exhibits a total solar reflectance of greater than 30%.

19. A method for reducing the energy consumption of a structure comprising applying the layered colored solar reflective system of claim 1 to one or more surfaces of the structure wherein the layered colored solar reflective system causes the surface temperature of the resultant coated surface to be lowered relative to a surface temperature of a surface coated with a non-reflective coating of the same color such that less energy is needed to cool the interior of the structure.

20. A method for controlling the temperature increase of a structure exposed to infrared radiation comprising: (i) applying a first coating composition onto the structure to form a first layer and (ii) applying a second coating composition onto at least a portion of the first layer to fours a second layer, wherein the first coating composition comprises a first particulate material having a substantially rutile crystal habit and an average particle size within a range of about 0.55 μm and about 0.95 μm dispersed in a vehicle and wherein the second coating composition comprises a second particulate material having a substantially rutile crystal habit and an average particle size within a range of about 1.0 μm and 1.6 μm and a colorant dispersed in a vehicle.

21. The use of the layered colored solar reflective system of claim 1 to reduce the energy consumption of a structure.

22. The use of the layered colored solar reflective system of claim 1 to control the temperature increase of a structure exposed to infrared radiation.

* * * * *